United States Patent
Kalaboukis (10) Patent No.: US 11,720,896 B1
(45) Date of Patent: Aug. 8, 2023

(54) APPARATUSES, COMPUTER-IMPLEMENTED METHODS, AND COMPUTER PROGRAM PRODUCTS FOR PROXIMATE FINANCIAL TRANSACTIONS

(71) Applicant: Wells Fargo Bank, N.A., San Francisco, CA (US)

(72) Inventor: Chris Theodore Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/117,707

(22) Filed: Dec. 10, 2020

(51) Int. Cl.
G06Q 40/00 (2023.01)
G06Q 20/40 (2012.01)
G06F 16/9535 (2019.01)

(52) U.S. Cl.
CPC ....... *G06Q 20/401* (2013.01); *G06F 16/9535* (2019.01)

(58) Field of Classification Search
CPC .......................... G06Q 20/401; G06F 16/9535
See application file for complete search history.

(56) References Cited

U.S. PATENT DOCUMENTS

| | | |
|---|---|---|
| 9,317,860 B2 | 4/2016 | Calman et al. |
| 9,383,218 B2 | 7/2016 | Cragun et al. |
| 9,477,852 B1 | 10/2016 | Breed et al. |
| 9,557,807 B2 | 1/2017 | Mick et al. |
| 10,289,987 B1 | 5/2019 | Walker et al. |
| 10,614,445 B1 * | 4/2020 | Dorsey .............. G06Q 20/3223 |

(Continued)

FOREIGN PATENT DOCUMENTS

| | | | | |
|---|---|---|---|---|
| CA | 2824627 A1 * | 8/2012 | ............ | G06F 16/211 |
| EP | 2913807 A1 * | 9/2015 | ............ | G06Q 20/20 |

OTHER PUBLICATIONS

Onorato et al: "Virtual Reality and Augmented Reality A New Reality for Brand Owners?", Published in Landslide® magazine, vol. 11, No. 1, a publication of the ABA Section of Intellectual Property Law (ABA-IPL) (Year: 2018).*

(Continued)

*Primary Examiner* — Edward J Baird
(74) *Attorney, Agent, or Firm* — Womble Bond Dickinson (US) LLP (57) ABSTRACT

Computer-implemented methods, apparatuses, and computer program products are disclosed for proximate financial transactions. An example method includes receiving a request for participation in a proximate financial transaction by a first user device associated with a first user and a first user profile where the proximate financial transaction is associated with a transfer of physical currency notes. The method further includes determining at least a second user device associated with a second user and second user profile proximate the first user for participation in the proximate financial transaction. The method also includes causing presentation of identification data of the second user via the first user device and detecting the transfer of physical currency notes between the first user and the second user. The method further includes effectuating an electronic financial transaction between a first user account of the first user and a second user account of the second user.

20 Claims, 5 Drawing Sheets

(56) References Cited

U.S. PATENT DOCUMENTS

| | | | |
|---|---|---|---|
| 10,636,063 B1 | 4/2020 | Kalaboukis | |
| 10,691,946 B2 | 6/2020 | Lin et al. | |
| 10,755,360 B1 | 8/2020 | Hecht et al. | |
| 10,769,881 B1 | 9/2020 | Adams | |
| 2014/0063060 A1* | 3/2014 | Maciocci | G06F 3/011 |
| | | | 345/633 |
| 2014/0129328 A1 | 5/2014 | Mathew | |
| 2015/0186984 A1* | 7/2015 | Loganathan | G07F 9/0235 |
| | | | 705/27.1 |
| 2018/0267904 A1* | 9/2018 | Kurian | G06F 3/0647 |
| 2018/0268607 A1* | 9/2018 | Mullins | G06F 1/1686 |
| 2019/0172366 A1* | 6/2019 | Birt | G06Q 10/063112 |
| 2019/0188788 A1 | 6/2019 | Collins et al. | |
| 2019/0253250 A1* | 8/2019 | Bruner | G06F 21/445 |
| 2021/0142298 A1* | 5/2021 | Fernandez | G07F 19/206 |

OTHER PUBLICATIONS

"Digitalisation and Finance" OECD, Financial Markets, Insurance and Private Pensions, dated 2018.

"Your Way Desjardins" [retrieved from the Internet], <https://appadvice.com/app/your-way-desjardins/785505194>, dated Dec. 30, 2013.

Bradley, Joseph et al. "The Advice Advantage", Cisco Systems Inc., dated Feb. 2015.

\* cited by examiner

APPARATUSES, COMPUTER-IMPLEMENTED METHODS, AND COMPUTER PROGRAM PRODUCTS FOR PROXIMATE FINANCIAL TRANSACTIONS

TECHNOLOGICAL FIELD

Example embodiments of the present disclosure relate generally to financial transactions and, more particularly, to facilitating financial transactions between proximate users.

BACKGROUND

Physical currency notes, bills, banknotes, and other legal tender are widely used by consumers as payment in exchange for goods and services. In some instances, business, vendors, service providers, and other entities may only accept physical currency as payment for their goods and services such that available physical currency is required to interact with these entities. The ability to retrieve physical currency, however, may often be limited to automated teller machines (ATMs) or similar devices that may not be readily accessible.

BRIEF SUMMARY

As described above, various forms of physical currency (e.g., notes, bills, banknotes, etc.) are often used by consumers in the normal course of purchasing goods and services. For example, a customer may interact with a merchant by purchasing an item for sale from the merchant via exchanging physical currency notes for the item. In some instances, however, the customer may not have access to physical currency, and the merchant may not accept electronic forms of payment. In these instances, many individuals may exist who would be willing to loan or otherwise provide physical currency to other individuals in their vicinity. These individuals, however, are not only unable to identify others willing to lend physical currency or in need of physical currency, but they are further unable to verify the trustworthiness of individuals nearby with which to interact.

To solve these issues and others, example implementations of embodiments of the present disclosure may provide devices and environments in which users may readily ascertain those that are willing to lend physical currency and those that need physical currency. In operation, embodiments of the present disclosure may receive a request for participation in a proximate financial transaction by a first user (e.g., recipient user or lending user) and may determine a second user (e.g., a lending user or recipient user) proximate the first user for participating in the proximate financial transaction. The systems may present identification data, in an augmented reality (AR) environment or otherwise, to the first user that identifies the second user (e.g., an AR marker or the like) and detect the transfer of physical currency between the first and second users. Once physical currency is exchanged, the system may effectuate an electronic financial transaction between accounts of the first user and the second user. In some embodiments, user profile data (e.g., amount for lending/receiving, credit score, transaction history, etc.) for the first user may be used to determine the second user with which the first user may interact. In this way, the inventors have identified that the advent of emerging computing technologies have created a new opportunity for solutions for financial transactions which were historically unavailable. In doing so, such example implementations confront and solve at least two technical challenges: (1) they reliably determine proximate users that satisfy transaction parameters, and (2) they authenticate financial transactions that include the exchange of physical currency.

As such, apparatuses, computer-implemented methods, and computer program products are provided for proximate financial transactions. With reference to an example method, the example method may include receiving, via a computing device, a request for participation in a proximate financial transaction by a first user device associated with a first user and a first user profile, wherein the proximate financial transaction may be associated with a transfer of physical currency notes. The method may include determining at least a second user device associated with a second user and a second user profile proximate the first user for participation in the proximate financial transaction and causing presentation of identification data of the second user for display to the first user via the first user device. The method may also include detecting the transfer of physical currency notes between the first user and the second user and effectuating an electronic financial transaction between a first user account of the first user and a second user account of the second user responsive to the transfer of physical currency notes.

In some embodiments, causing presentation of the identification data of the second user for display includes generating an augmented reality environment and causing a digital object based upon the identification data to be rendered in the augmented reality environment for viewing by the first user via the first user device.

In some embodiments, effectuating the electronic financial transaction between the first user account and the second user account further includes transmitting an actionable notification to the first user device and the second user device. In an instance in which the computing device receives responsive approval to the actionable notification from the first user device and the second user device, the method may include authenticating the electronic financial transaction between the first user account and the second user account. In an instance in which the computing device fails to receive responsive approval to the actionable notification from either the first user device or the second user device, the method may include preventing the electronic financial transaction between the first user account and the second user account.

In some embodiments, determining the second user device associated with the second user and the second user profile for participation in the proximate financial transaction further includes accessing, via a database, first user profile data of the first user and determining a plurality of users proximate the first user device and the first user. In such an embodiment, the method may further include accessing, via the database, user profile data associated with each user from amongst the plurality of users proximate the first user device and the first user and determining the second user device and second user as a user from amongst the plurality of users having user profile data that satisfies one or more transaction parameters defined by the first user profile data.

In some embodiments, the method may further include determining a third user device associated with a third user and a third user profile proximate the first user and the second user for participation in the proximate financial transaction.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Some embodiments of the present disclosure will now be described more fully hereinafter with reference to the accompanying drawings, in which some, but not all embodiments are shown. Indeed, these embodiments may take many different forms and should not be construed as limited to the embodiments set forth herein; rather, these embodiments are provided so that this disclosure will satisfy applicable legal requirements. Like numbers refer to like elements throughout. As used herein, the description may refer to a proximate transaction server as an example "apparatus." However, elements of the apparatus described herein may be equally applicable to the claimed computer-implemented method and computer program product. Thus, use of any such terms should not be taken to limit the spirit and scope of embodiments of the present invention.

DEFINITION OF TERMS

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used to mean "serving as an example, instance, or illustration." Any implementation described herein as "example" is not necessarily to be construed as preferred or advantageous over other implementations.

As used herein, the terms "user device," "first user device," "second user device," "third user device," and the like refer to computer hardware and/or software that is configured to access a service made available by the proximate transaction server and, among various other functions, is configured to directly, or indirectly, transmit and receive data. Example user devices may include a smartphone, a tablet computer, a laptop computer, a wearable device (e.g., smart glasses, smartwatch, or the like), virtual reality (VR) headset, augmented reality (AR) device, and the like. In some embodiments, a user device may include a "smart device" that is equipped with chip of other electronic device that is configured to communicate with the proximate transaction server via Bluetooth, NFC, Wi-Fi, 3G, 4G, 5G, RFID protocols, and the like. By way of a particular example, a first user device may be an virtual or augmented reality device (e.g., VR headset, smart glasses, etc.) associated with a first user (e.g., customer), and a second user device may a virtual or augmented reality device (e.g., VR headset, smart glasses, etc.) associated with a second user (e.g., financial advisory or other banking employee), where each user device is equipped with a Wi-Fi radio that is configured to communicate with a Wi-Fi access point that is in communication with the a server (e.g., a proximate transaction server of the present disclosure) via a network.

As used herein, the term "proximate financial transaction" may refer to a financial transaction that occurs between users and associated user devices that are physically (e.g., based on geographic location) located near one another. Furthermore, as described herein, example proximate financial transactions may further be associated with the transfer of physical currency notes between users. Said differently, the proximate financial transactions described herein may, at least in part, involve the physical exchange of physical currency notes between users and an electronic financial transaction between the users based upon the transfer of physical currency notes. As described hereafter, the proximity between a first user device and a second user device may refer to any geographical distance between user devices based upon the intended application of the embodiments of the present disclosure.

As used herein, the term "user profile data" may refer to a collection of settings, configurations, identifiers, data, and information associated with a user and associated user device. User profile data configured in accordance with the present disclosure may be stored by an associated user device, user profile, or the like and may be accessible by one or more of the software applications that are supported by the proximate transaction server and, thus, may include application-specific preferences, settings, configurations, data, and information. In some example embodiments, user profile data of a first user may include account information, preferences, transaction information, and/or the like associated with the first user as described hereafter. Furthermore, user profile data of a first user may include one or more transaction parameters that, for example, define requirements (e.g., repayment terms, interest rate, transaction fees, etc.) of the first user with regard to a proximate financial transaction with a particular user (e.g., second user) having particular user profile data (e.g., second user profile data). As described hereafter, user profile data may refer to settings associated with a particular user and associated user device in instances in which the user is the lending user (e.g., providing physical currency notes) and in which the user is the recipient user (e.g., receiving physical currency notes).

As used herein, the terms "virtual reality" or "VR" may refer to a user simulation or simulated experience in which a user's physical presence is provided in a virtual environment. Such a virtual environment may include any number of artificial items, features, or the like with which the user may interact. Furthermore, a VR environment may include various forms of feedback to a user's interactions (e.g., audio or tactile feedback) and may utilize associated VR headsets, head-mounted displays, or multi-projected environments. Similarly, the terms "augmented reality" or "AR" may refer to an interactive experience that enhances objects in a real-world environment. Said differently, AR may combine real and virtual worlds or items and, in some instances, may operate as an overlay of a user's real environment. As opposed to virtual reality in which a user's environment is partially or completed simulated, an augmented reality environment may only project virtual items into a user's field of view. An AR environment may utilize associated AR headsets, smart glasses, displays, or the like in order to enhance the user's real world environment.

As used herein, the terms "physical currency," "physical currency notes," and "currency" may refer to any negotiable promissory note issued by a bank (e.g., central bank) or government as legal tender. In some instances, these terms may refer to paper money or banknotes but may similarly be used to refer to coin currency or any other physical instrument used to purchase goods or services.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

Figure 1:
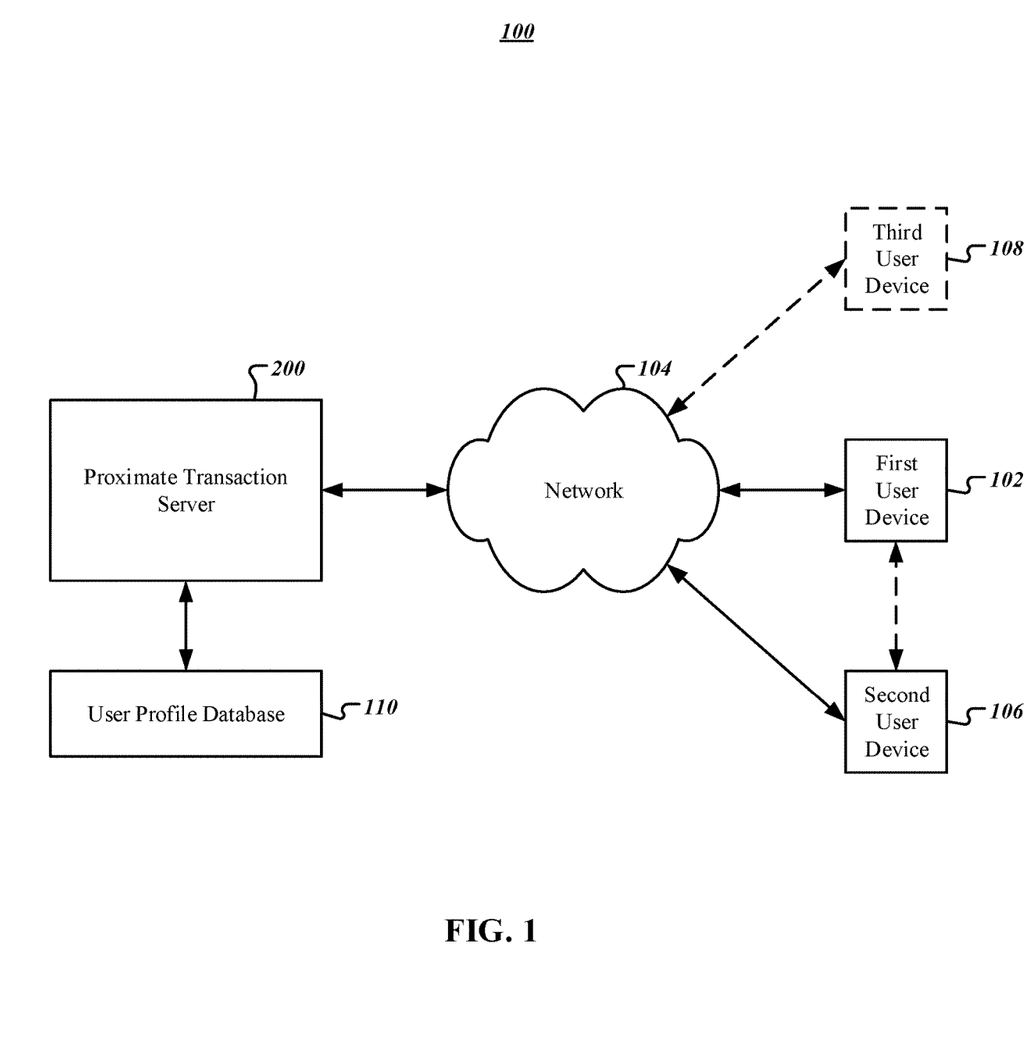
FIG. 1 illustrates a system diagram including devices that may be involved in some example embodiments described herein.

With reference to FIG. 1, an example system 100 is illustrated with an apparatus (e.g., a proximate transaction server 200) communicably connected via a network 104 to a first user device 102, a second user device 106, and, in some embodiments, a third user device 108. Although illustrated connected to the proximate transaction server 200 via a network 104, the present disclosure contemplates that one or more of the first user device 102, the second user device 106, and/or the third user device 108 may be hosted and/or stored by the proximate transaction server 200. The example system 100 may also include a user profile database 110 that may be hosted by the proximate transaction server 200 or otherwise hosted by devices in communication with the proximate transaction server 200.

The proximate transaction server 200 may include circuitry, networked processors, or the like configured to perform some or all of the apparatus-based (e.g., proximate transaction server-based) processes described herein, and may be any suitable network server and/or other type of processing device. In this regard, proximate transaction server 200 may be embodied by any of a variety of devices. For example, the proximate transaction server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the proximate transaction server 200 may be located remotely from the first user device 102, the second user device 106, and/or the third user device 108 although in other embodiments, the proximate transaction server 200 may comprise the first user device 102, the second user device 106, and/or the third user device 108. The proximate transaction server 200 may, in some embodiments, comprise several servers or computing devices performing interconnected and/or distributed functions. Despite the many arrangements contemplated herein, the proximate transaction server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 102 may be associated with a first user and may be configured to store or access various first user profile data associated with the first user. Although a single first user device 102 is shown in FIG. 1, the example system 100 may include any number of user devices associated with the first user. The first user device 102 may be a cellular telephone (including smartphones and/or other types of mobile telephones), laptop, tablet, electronic reader, e-book device, media device, wearable, smart glasses, smartwatch, VR device, AR device, or any combination of the above. The first user device 102 may be communicably coupled with the proximate transaction server 200, the second user device 106, and/or the third user device 108, via the network 104, and configured to transmit data to and receive data from the proximate transaction server 200, the second user device 106, and/or the third user device 108. By way of example, the first user device 102 may include a smartphone or AR device configured to generate location data representative of the geolocation of the first user device 102, as relevant to device proximity, and may, in some embodiments, be configured to render a digital object in an AR environment for viewing by the first user.

The second user device 106 may be associated with a second user and may be configured to store or access various second user profile data associated with the second user. Although a single second user device 106 is shown in FIG. 1, the example system 100 may include any number of user devices associated with the second user. The second user device 106 may be a cellular telephone (including smartphones and/or other types of mobile telephones), laptop, tablet, electronic reader, e-book device, media device, wearable, smart glasses, smartwatch, VR device, AR device, or any combination of the above. The second user device 106 may be communicably coupled with the proximate transaction server 200, the first user device 102, and/or the third user device 108, via the network 104, and configured to transmit data to and receive data from the proximate transaction server 200, the first user device 102, and/or the third user device 108. By way of example, the second user device 106 may also include a smartphone or AR device configured to generate location data representative of the geolocation of the second user device, as relevant to device proximity, and may, in some embodiments, be configured to render a digital object in an AR environment for viewing by the second user.

The third user device 108 may be associated with a third user and may be configured to store or access various third user profile data associated with the third user. Although a single third user device 108 is shown in FIG. 1, the example system 100 may include any number of user devices associated with the third user. The third user device 108 may be a cellular telephone (including smartphones and/or other types of mobile telephones), laptop, tablet, electronic reader, e-book device, media device, wearable, smart glasses, smartwatch, VR device, AR device, or any combination of the above. The third user device 108 may be communicably coupled with the proximate transaction server 200, the first user device 102, and/or the second user device 106, via the network 104, and configured to transmit data to and receive data from the proximate transaction server 200, the first user device 102, and/or the second user device 106. By way of example, the third user device 108 may also include a smartphone or AR device configured to generate location data representative of the geolocation of the third user device, as relevant to device proximity, and may, in some embodiments, be configured to render a digital object in an AR environment for viewing by the third user.

The user profile database 110 may be stored by any suitable storage device or repository configured to store some or all of the information described herein (e.g., memory 204 of the proximate transaction server 200 or a separate memory system separate from the proximate transaction server 200, such as one or more database systems, backend data servers, network databases, cloud storage devices, or the like provided by another device (e.g., online application or $3^{rd}$ party provider)). The user profile database 110 may comprise data received from the proximate transaction server 200 (e.g., via a memory 204 and/or processor(s) 202), the first user device 102, the second user device 106, and/or the third user device 108, and the corresponding storage device may thus store this data.

Figure 2:
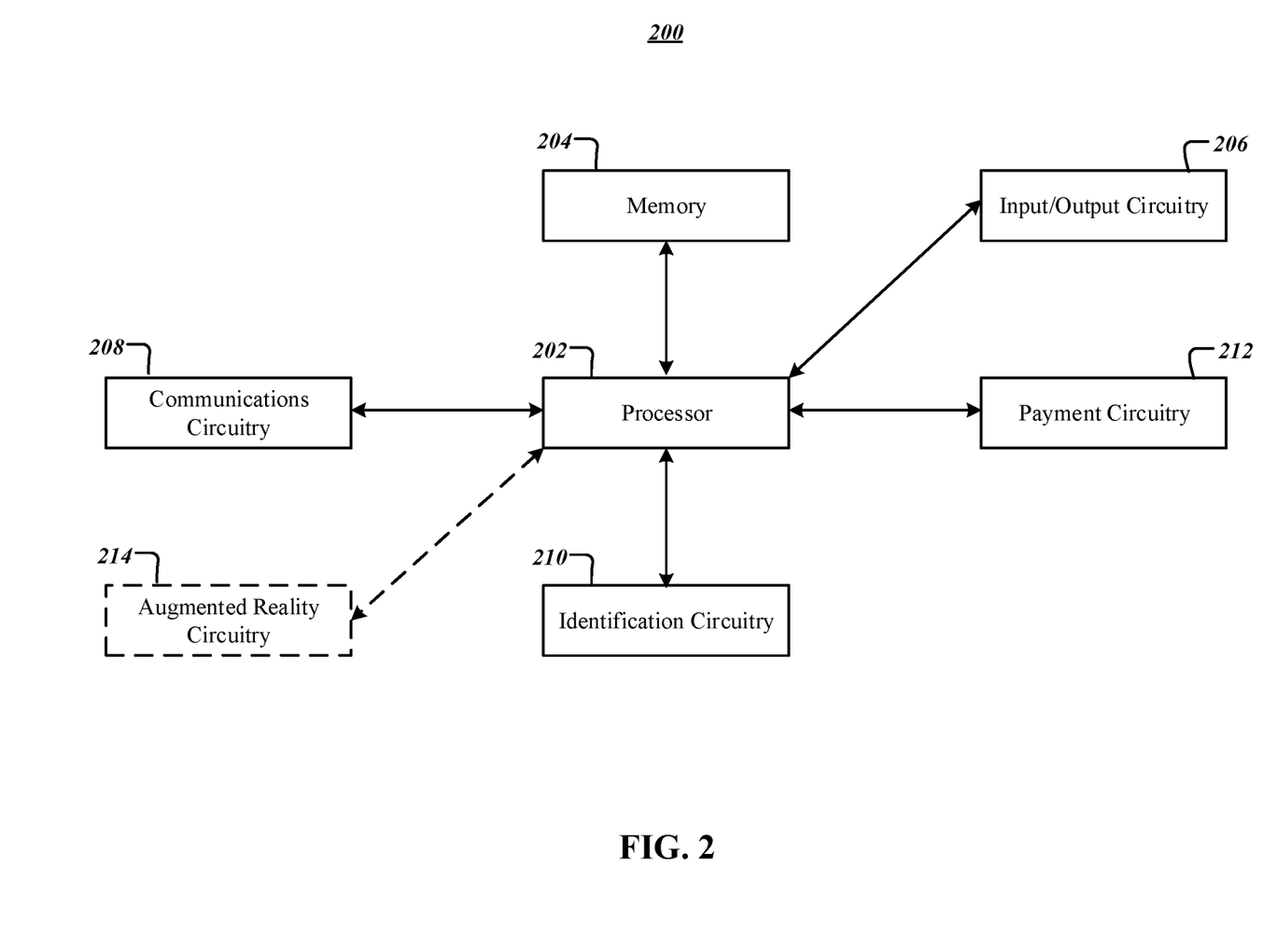
FIG. 2 illustrates a schematic block diagram of example circuitry that may perform various operations, in accordance with some example embodiments described herein.

As illustrated in FIG. 2, the proximate transaction server 200 may include a processor 202, a memory 204, communications circuitry 208, and input/output circuitry 206. Moreover, the proximate transaction server 200 may include identification circuitry 210, augmented reality circuitry 214, and/or payment circuitry 212. The proximate transaction server 200 may be configured to execute the operations described below in connection with FIGS. 3-5. Although components 202-214 are described in some cases using functional language, it should be understood that the particular implementations necessarily include the use of particular hardware. It should also be understood that certain of these components 202-214 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the proximate transaction server 200 may be housed within the first user device 102, the second user device 106, and/or the third user device 108. It will be understood in this regard that some of the components described in connection with the proximate transaction server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the proximate transaction server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the proximate transaction server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the proximate transaction server 200 to carry out various functions in accordance with example embodiments of the present disclosure.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the proximate transaction server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The proximate transaction server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the proximate transaction server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the proximate transaction server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The identification circuitry 210 includes hardware components designed to determine user devices associated with respective users and user profiles proximate a first user and first user device for participation in the proximate financial transaction. In particular, the identification circuitry 210 may analyze location data associated with user devices to determine the respective geolocation of each user device, access user profile data, and determine a user and user device for participation in the proximate financial transaction based upon transaction parameters defined by first user profile data. The identification circuitry 210 may utilize processing circuitry, such as the processor 202, to perform its corresponding operations, and may utilize memory 204 to store collected information.

The payment circuitry 212 includes hardware components designed to detect the transfer of physical currency notes between users. Furthermore, payment circuitry 212 may effectuate an electronic financial transaction between a first user account of the first user and a second user account of the second user responsive to the transfer of physical currency notes. The payment circuitry 212 may utilize processing circuitry, such as the processor 202, to perform its corresponding operations, and may utilize memory 204 to store collected information.

The augmented reality circuitry 214 includes hardware components designed to generate an augmented reality environment as defined above. The augmented reality circuitry 212 may further cause a digital object, based upon identification data of a second user and second user device, to be rendered in the augmented reality environment for viewing by the first user via the first user device 102. The augmented reality circuitry 214 may utilize processing circuitry, such as the processor 202, to perform its corresponding operations, and may utilize memory 204 to store collected information.

It should also be appreciated that, in some embodiments, the identification circuitry 210, payment circuitry 212, and/or augmented reality circuitry 214 may include a separate processor, specially configured field programmable gate array (FPGA), or application specific interface circuit (ASIC) to perform its corresponding functions.

In addition, computer program instructions and/or other type of code may be loaded onto a computer, processor, or other programmable proximate transaction server's circuitry to produce a machine, such that the computer, processor other programmable circuitry that execute the code on the machine create the means for implementing the various functions, including those described in connection with the components of proximate transaction server 200.

As described above and as will be appreciated based on this disclosure, embodiments of the present disclosure may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Proximate Financial Transactions

Figure 3:
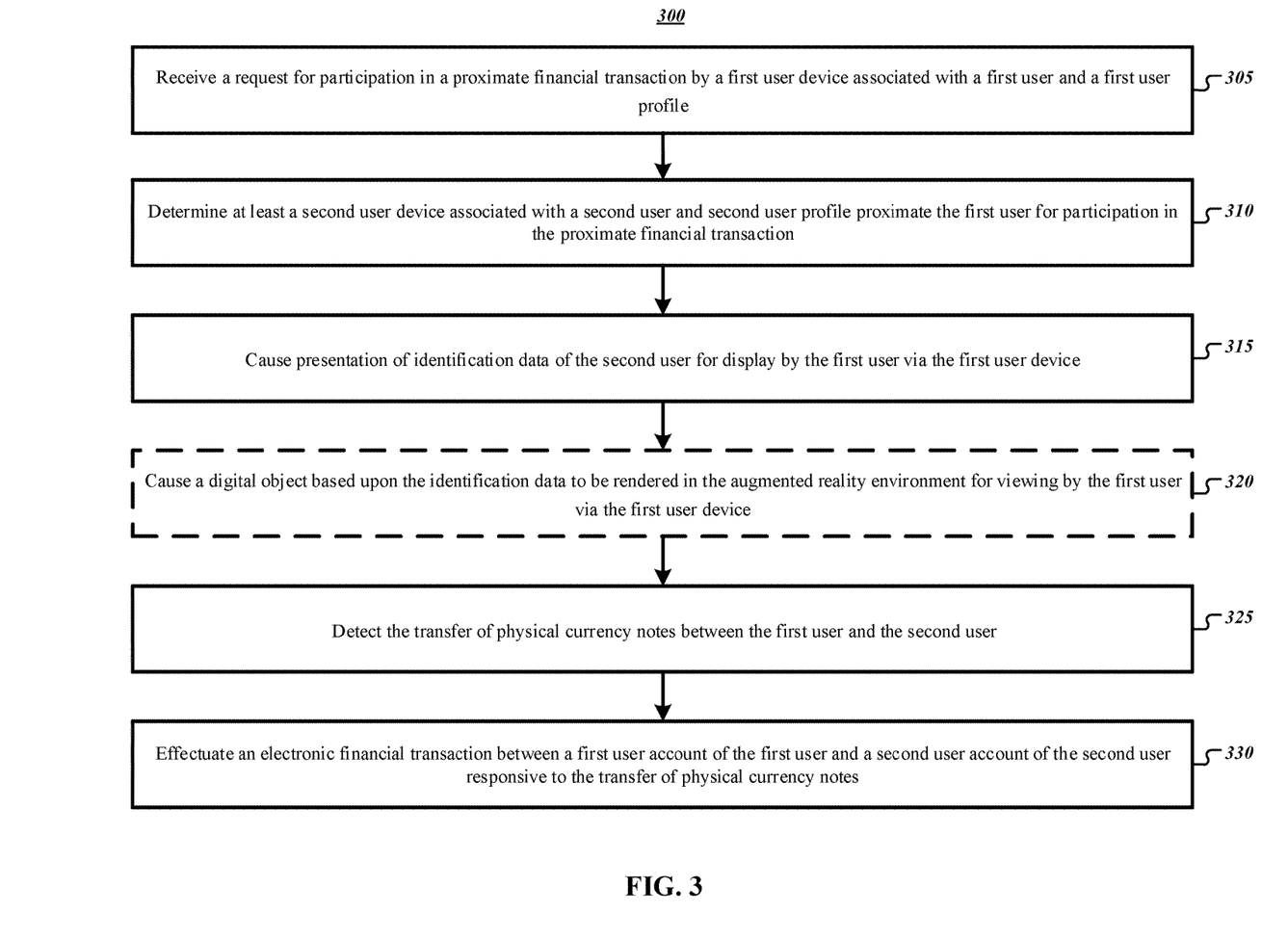
FIG. 3 illustrates an example flowchart for proximate financial transactions, in accordance with some example embodiments described herein.

FIG. 3 illustrates a flowchart containing a series of operations for proximate financial transactions. The operations illustrated in FIG. 3 may, for example, be performed by, with the assistance of, and/or under the control of an apparatus (e.g., proximate transaction server 200), as described above. In this regard, performance of the operations may invoke one or more of processor 202, memory 204, input/output circuitry 206, communications circuitry 208, identification circuitry 210, payment circuitry 212, and/or augmented reality circuitry 214.

As shown in operation 305, the apparatus (e.g., proximate transaction server 200) includes means, such as input/output circuitry 206, communications circuitry 208, or the like, for receiving a request for participation in a proximate financial transaction by a first user device 102 associated with a first user and a first user profile. As described above, the use of physical currency (e.g., bills, notes, etc.) is prevalent in many industries, locations, etc. as a mechanism to purchase goods and services. In some locations, for example, a street market or the like, electronic payment mechanisms may be unavailable, such as for cash only venders or merchants. As such, the proximate financial transaction as defined above may be associated with, in whole or in part, a transfer of physical currency notes. As described hereafter, the first user device 102, first user, and first user profile may refer to a user operating as either the lending user (e.g., provider of physical currency notes) or the recipient user (e.g., receiver of physical currency notes).

By way of example, a first user associated with a first user device 102 and first user profile may indicate a willingness, via user input, user profile data, or the like, to operate as a lending user capable of providing physical currency notes as part of a financial transaction. In some embodiments, the first user, via the first user device 102, may transmit a request received by the proximate transaction server 200 at operation 305 that requests participation in a proximate financial transaction as a lending user. For example, the first user may possess physical currency notes of various denominations that the first user is willing to provide to other users (e.g., a second user associated with a second user device 106) in exchange for a responsive electronic financial transaction from the other user. The transmission of such a request by, for example, the first user device 102 may occur based upon one or more user instructions or preferences associated with the first user profile, first user, and first user device 102. By way of example, the first user may define preferences indicating a willingness to operate as a lending user for a proximate financial transaction in certain geolocations, at certain times, for certain types of transactions, or the like. By way of a particular example, the first user may define preferences indicative of the willingness to operate as a lending user in an instance in which the geolocation of the first user device 102 is associated with (e.g., within a defined location, geofence, or the like) a geolocation of a cash only street market.

In some embodiments, the request for participation received at operation 305 may, for example, be received by the proximate transaction server 200 in response to a request transmitted by the proximate transaction server 200. By way of example and as described hereafter with reference to recipient users, the proximate transaction server 200 may receive requests from users that indicate a need for physical currency notes. As such, the proximate transaction server 200 may be configured to, in some embodiments, transmit a request for participation in a proximate financial transaction to a plurality of user devices proximate (e.g., within a defined geolocation or location range) a user device (e.g., second user device 106) associated with a recipient user. As such, the request for participation in the proximate financial transaction by the lending user (e.g., first user and first user device 102) may occur responsive to a request for participation by the proximate transaction server 200.

In some embodiments, a first user associated with a first user device 102 and first user profile may indicate a willingness, via user input, user profile data, or the like, to operate as a recipient user capable of receiving physical currency notes as part of a financial transaction. In some embodiments, the first user, via the first user device 102, may transmit a request received by the proximate transaction server 200 at operation 305 that requests participation in a proximate financial transaction as a recipient user. For example, the first user may require physical currency notes (e.g., to complete a cash transaction or the like) that the first user is willing to receive from other users (e.g., a second user associated with a second user device 106) in exchange for a responsive electronic financial transaction to the other user. The transmission of such a request by, for example, the first user device 102 may occur based upon an active request by the first user indicative of a need for physical currency notes.

In some embodiments, the first user may define one or more user instructions or preferences associated with the first user profile, first user, and first user device 102 for acting as a recipient. By way of example, the first user may define preferences indicating a willingness to operate as a recipient user for a proximate financial transaction in certain geolocations, at certain times, for certain types of transactions, or the like. By way of a particular example, the first user may define preferences indicative of the willingness to operate as a recipient user in an instance in which the geolocation of the first user device 102 is associated with (e.g., within a defined location, geofence, or the like) a geolocation of a cash only street market. Said differently, the first user may indicate a preference to use physical currency notes when located in particular locations.

In some embodiments, the request for participation received at operation 305 may, for example, be received by the proximate transaction server 200 in response to a notification transmitted by the proximate transaction server 200. By way of example, the proximate transaction server 200 may receive requests from users that indicate a willingness to operate as a lending user for physical currency notes. As such, the proximate transaction server 200 may be configured to, in some embodiments, transmit a notification for participation in a proximate financial transaction to a plurality of user devices proximate (e.g., within a defined geolocation or location range) a user device (e.g., second user device 106) associated with the lending user. As such, the request for participation in the proximate financial transaction by the recipient user (e.g., first user and first user device 102) may occur responsive to a notification of available lending users by the proximate transaction server 200.

As shown in operation 310, the apparatus (e.g., proximate transaction server 200) includes means, such as communications circuitry 208, identification circuitry 210, or the like, for determining at least a second user device 106 associated with a second user and a second user profile proximate the first user for participation in the proximate financial transaction. As described hereafter with reference to FIG. 5, the identification circuitry 210 may be configured to access, via the user profile database 110 or otherwise, first user profile data that defines one or more transaction parameters and determine a plurality of users proximate the first user device 102 and first user. By way of example, each user device (e.g., first user device 102, second user device 106, and/or third user device 108) in communication with the proximate transaction server 200 may provide an indication of the geolocation of the respective user device. In some instances, each user device may periodically provide geolocation data (e.g., global positioning system (GPS) coordinates or the like) to the proximate transaction server 200. In other instances, the proximate transaction server 200 may determine the location of each user device based upon, for example, connectivity with an access point, an interaction with a scanning device, an electronic transaction with a merchant, and/or the like. As such, the determination of a second user that is proximate the first user and first user device 102 may include analyzing user profile data of a plurality of user devices having geolocation data indicative of a defined proximity to the first user device 102, as defined by proximity thresholds, geofences, or the like.

As described above, the first user profile data of a first user may include one or more transaction parameters that define requirements (e.g., repayment terms, interest rates, transaction fees, etc.) of the first user with regard to a proximate financial transaction with a particular user (e.g., second user) having particular user profile data (e.g., second user profile data). When the first user and first user device 102 are acting as a lending user, the first user profile data and transactions parameters may define, for example, an amount of physical currency notes available for lending, a required credit score to interact with the first user, a minimum number of successfully completed proximate financial transactions to interact with the first user, a transaction fee or interest rate associated with receipt of the physical currency notes, among others. The transaction parameters defined by the first user profile data may, in some embodiments, vary based upon the user profile data associated with the second user and associated second user device 106. By way of example, the number or amount of physical currency notes that the first user is willing to provide to the second user may increase or decrease based upon the associated credit score of the second user.

When the first user and first user device 102 are acting as a recipient user, the first user profile data and transactions parameters may define, for example, a desired amount of physical currency notes, a required credit score to interact with the first user, a minimum number of successfully completed proximate financial transactions to interact with the first user, a maximum transaction fee or interest rate associated with receipt of the physical currency notes, among others. As above for the first user operating as a lending user, the transaction parameters defined by the first user profile data may, in some embodiments, vary for the first user acting as a recipient user based upon the user profile data associated with the second user and associated second user device 106. By way of example, the desired number or amount of physical currency notes that the first user is willing to receive from the second user may increase or decrease based upon the associated transaction fee charged by the second user.

Thereafter, as shown in operation 315, the apparatus (e.g., proximate transaction server 200) includes means, such as communications circuitry 208, augmented reality circuitry 214, or the like, for causing presentation of identification data of the second user for display to the first user via the first user device 102. Following determination of the second user and associated second user device 106, the proximate transaction server 200 may operate to indicate the second user to the first user. By way of example, the proximity of the first user and associated first user device 102 and the second user and associated second user device 106 may be such that the first and second users may move to a common location to meet for the transfer of physical currency notes. As such, the identification data of the second user may, in some embodiments, include geolocation data of the second user device 106 so as to guide the first user to the second user. In some embodiments, the identification data of the second user may include a visual representation of the second user (e.g., an image, video, textual description, or the like of the second user) so as to facilitate identification of the second user. The communications circuitry 208 may be configured to, in some embodiments, provide identification data of the second user to the first user device for displaying by, for example, a user interface of the first user device 102. The present disclosure contemplates that the identification data of the second user may include any data entry, descriptor, image, indicator, or the like that may be used by the first user, via the first user device 102, to identify the second user.

In some embodiments, as shown in operation 320, the apparatus (e.g., proximate transaction server 200) includes means, such as communications circuitry 208, augmented reality circuitry 214, or the like, for generating an augmented reality environment and causing a digital object based upon the identification data to be rendered in the augmented reality environment for viewing by the first user via the first user device 102. As described above, the first user device 102, the second user device 106, and/or the third user device 108 may include augmented reality functionality (e.g., smart glasses, AR headsets, or the like) configured to provide an interactive experience that enhances objects in a real-world environment. Said differently, the first user device 102 may be configured to project virtual items (e.g., a digital object) into a user's field of view. By way of example, the first user device 102 may comprise smart glasses that are worn by the first user. In such an example, the proximate transaction server 200 may cause presentation of the identification data of the second user by generating an AR environment and causing a digital object, based upon the identification data, to be rendered in the AR environment that identifies the second user. By way of a particular example, the digital object based upon the identification data may include an arrow, outline, or other feature configured to indicate the second user and, in some instances, the second user profile data to the first user, via the first user device 102. The second user device 106 may similarly view one or more digital objects based upon identification data of the first user in an AR environment via an AR device, smart glasses, or the like.

Thereafter, as shown in operation 325, the apparatus (e.g., proximate transaction server 200) includes means, such as communications circuitry 208, payment circuitry 212, or the like, for detecting the transfer of physical currency notes between the first user and the second user. Following identification of the respective users of the proximate financial transaction, the first user and associated first user 102 device may be physically located proximate the second user and associated second user device 106. In this way, the first user and the second user may transfer physical currency notes. In an instance in which the first user is acting as a lending user, operation 325 may refer to the first user providing physical currency notes to the second user. In an instance in which the first user is acting as a recipient user, operation 325 may refer to the second user providing physical currency notes to the first user. In order to detect that the transfer of physical currency notes has occurred, the proximate transaction server 200 may, for example, transmit an actionable notification to each of the first user device 102 and the second user device 106 as described hereafter with reference to FIG. 4. The actionable notification described hereafter may operate to verify that the physical currency notes are properly transferred between the first user and the second user.

In some embodiments, the payment circuitry 212 may utilize video data, image data, or the like associated with one or more of the first user device 102 or the second user device 106 to detect the transfer of physical currency notes between the first user and the second user. By way of example, the payment circuitry 212 may include circuitry components configured to receive image data from the first user device 102 that includes the physical transfer of the physical currency notes within the field of view of the first user device 102 (e.g., a camera of the first user device 102 or otherwise). The payment circuitry 212 may further include circuitry components configured to process the image data or video data (e.g., a streaming collection of image data) in order to determine the transfer of physical currency notes. Although described herein with reference to actionable notifications and image processing techniques, the present disclosure contemplates that any mechanism for detecting the transfer of physical currency notes may be used based upon the intended application of the proximate transaction server 200.

Thereafter, as shown in operation 330, the apparatus (e.g., proximate transaction server 200) includes means, such as communications circuitry 208, payment circuitry 212, or the like, for effectuating an electronic financial transaction between a first user account of the first user and a second user account of the second user responsive to the transfer of physical currency notes. In some embodiments, the proximate transaction server 200 may be formed as part of the system of a financial institution that supports a first account of the first user and/or a second account of the second user. In such an embodiment, the payment circuitry 212 may effectuate an electronic financial transaction between the first user account and the second user account based upon the transfer of physical currency notes. For example, in an instance in which the first user and associated first user device 102 are acting as a lending user, the transfer at operation 330 may refer to a transfer of funds from an account of the second user to the first user. In an instance in which the first user and associated first user device 102 are acting as a recipient user, the transfer at operation 330 may refer to a transfer of funds from an account of the first user to the second user. As described above, the lending user and the recipient user may each define, via respective user profile data, transaction parameters indicative of preferences or instructions associated with the proximate financial transaction. In some embodiments, the respective profile data may define a transaction cost associated with the transfer of physical currency notes such that the electronic financial transaction may, for example, include electronic funds equivalent to the number or amount of physical currency notes transferred between the first user and the second user and a transaction fee, interest payment, or the like as defined by the applicable user profile data.

Figure 4:
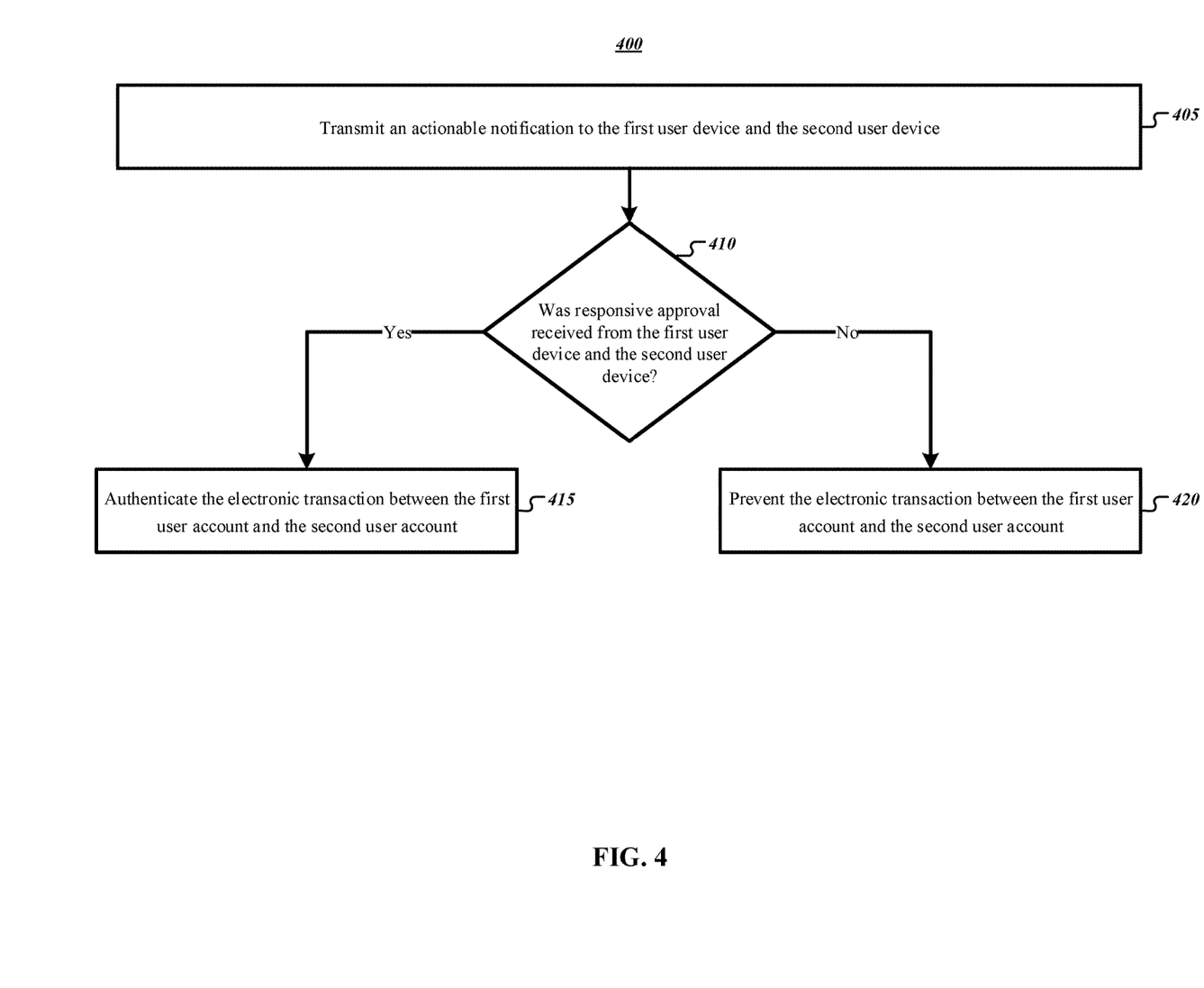
FIG. 4 illustrates an example flowchart for electronic financial transaction authentication, in accordance with some example embodiments described herein.

FIG. 4 illustrates a flowchart containing a series of operations for electronic financial transaction authentication. The operations illustrated in FIG. 4 may, for example, be performed by, with the assistance of, and/or under the control of an apparatus (e.g., proximate transaction server 200), as described above. In this regard, performance of the operations may invoke one or more of processor 202, memory 204, input/output circuitry 206, communications circuitry 208, identification circuitry 210, payment circuitry 212, and/or augmented reality circuitry 214.

As shown in operation 405, the apparatus (e.g., proximate transaction server 200) includes means, such as communications circuitry 208, payment circuitry 212, or the like, for transmitting an actionable notification to the first user device 102 and the second user device 106. As described above, an actionable notification may operate to verify that the physical currency notes are properly transferred between the first user and the second user prior to completion of the electronic transfer described above at operation 330. By way of example, the proximate transaction server 200 may transmit a notification to each of the first user device 102 (e.g., the lending or recipient user) and the second user device 106 (e.g., the other of the recipient or lending user). The actionable notification may, for example, include one or more actionable elements that may receive a user input. For example, the actionable notification may include actionable elements associated with a confirmation or approval of the transfer of the physical currency funds (e.g., a response via such an actionable element confirms the proper transfer of physical currency notes). The actionable notification may also include actionable elements associated with a rejection of the transfer of the physical currency funds (e.g., a response via such an actionable element indicates the improper transfer of physical currency notes). As shown in operation 410, the apparatus (e.g., proximate transaction server 200) includes means, such as communications circuitry 208, payment circuitry 212, or the like, for determining if responsive approval was received from each of the first user device 102 and the second user device 106.

In an instance in which the proximate transaction server 200 receives responsive approval to the actionable notification from the first user device 102 and the second user device 106, as shown in operation 415, the apparatus (e.g., proximate transaction server 200) includes means, such as communications circuitry 208, payment circuitry 212, or the like, for authenticating the electronic transaction between the first user account and the second user account. By way of example, the proximate transaction server 200 may receive a responsive notification from the first user device 102 and the second user device 106 that includes responses to the actionable elements described above that confirm or approve proper transfer of the physical currency notes. The payment circuitry 212 may subsequently authenticate or otherwise verify the validity of the proximate financial transaction and transfer electronic funds between the first user account and the second user account as described above with reference to operation 330. The present disclosure contemplates that the electronic financial transactions described herein may further account for any differences in exchange rates between foreign currencies.

In an instance in which the proximate transaction server 200 fails to receive responsive approval to the actionable notification from either the first user device 102 or the second user device 106, as shown in operation 420, the apparatus (e.g., proximate transaction server 200) includes means, such as communications circuitry 208, payment circuitry 212, or the like, for preventing the electronic financial transaction between the first user account and the second user account. By way of example, the proximate transaction server 200 may either fail to receive a responsive notification from the first user device 102 or the second user device 106 or may receive a responsive notification from either the first user device 102 or the second user device 106 that includes responses to the actionable elements described above that indicate the improper transfer of physical currency notes. The payment circuitry 212 may subsequently prevent the transfer electronic funds between the first user account and the second user account.

Figure 5:
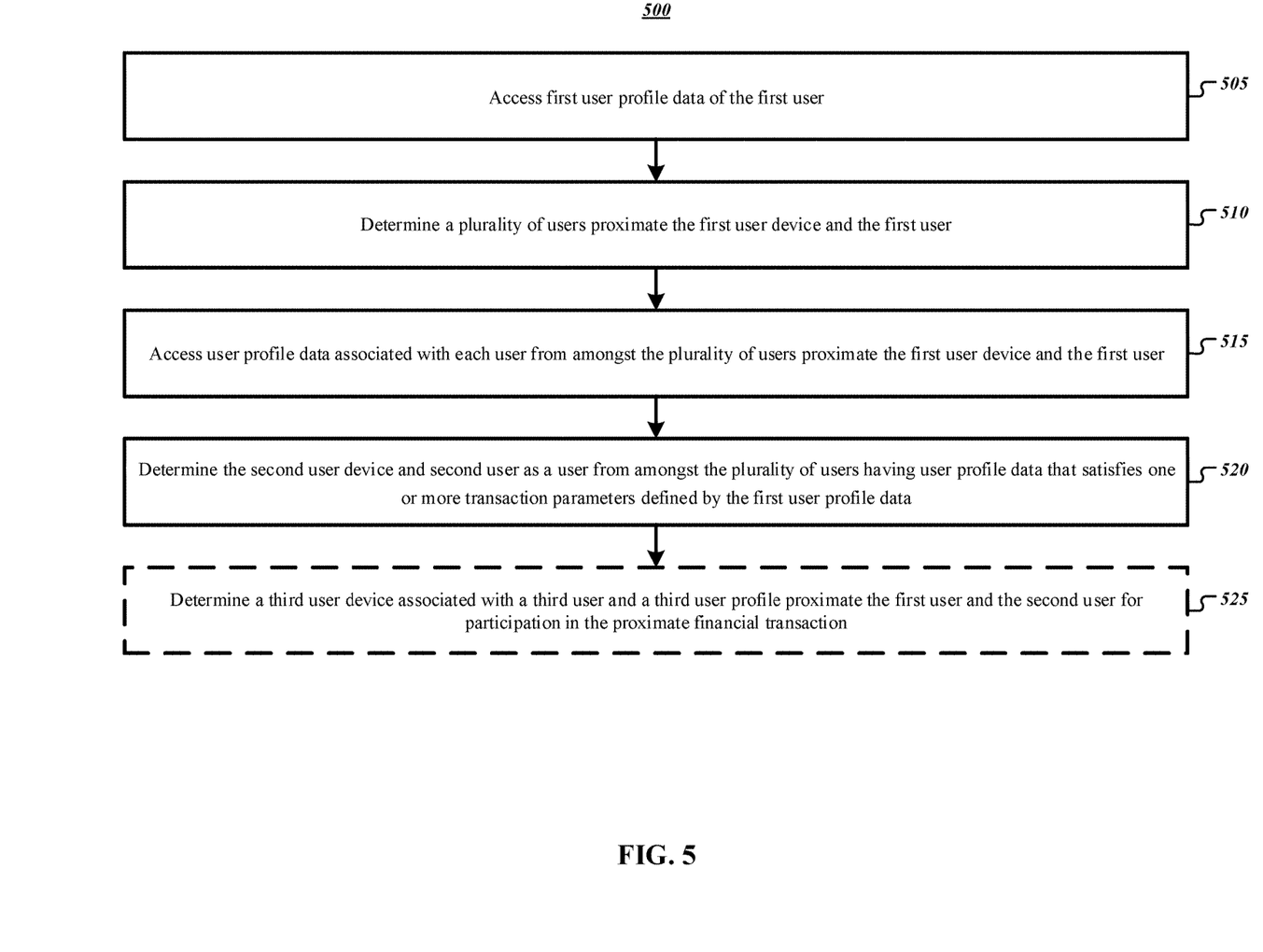
FIG. 5 illustrates an example flowchart for proximate user determinations, in accordance with some example embodiments described herein.

FIG. 5 illustrates a flowchart containing a series of operations for proximate user determinations. The operations illustrated in FIG. 5 may, for example, be performed by, with the assistance of, and/or under the control of an apparatus (e.g., proximate transaction server 200), as described above. In this regard, performance of the operations may invoke one or more of processor 202, memory 204, input/output circuitry 206, communications circuitry 208, identification circuitry 210, payment circuitry 212, and/or augmented reality circuitry 214.

As shown in operation 505, the apparatus (e.g., proximate transaction server 200) includes means, such as communications circuitry 208, identification circuitry 210, or the like, for accessing, via a database (e.g., user profile database 110), first user profile data of the first user. As described above, the first user profile data of a first user may include one or more transaction parameters that define requirements (e.g., repayment terms, interest rate, transaction fees, etc.) of the first user with regard to a proximate financial transaction with a particular user (e.g., second user) having particular user profile data (e.g., second user profile data). When the first user and first user device 102 are acting as a lending user, the first user profile data and transactions parameters may define, for example, an amount of physical currency notes available for lending, a required credit score to interact with the first user, a minimum number of successfully completed proximate financial transactions to interact with the first user, a transaction fee or interest rate associated with receipt of the physical currency notes, among others. The transaction parameters defined by the first user profile data may, in some embodiments, vary based upon the user profile data associated with the second user and associated second user device 106. By way of continued example, the number or amount of physical currency notes that the first user is willing to provide to the second user may increase or decrease based upon the associated credit score of the second user.

As described above, when the first user and first user device 102 are acting as a recipient user, the first user profile data and transactions parameters may define, for example, a desired amount of physical currency notes, a required credit score to interact with the first user, a minimum number of successfully completed proximate financial transactions to interact with the first user, a maximum transaction fee or interest rate associated with receipt of the physical currency notes, among others. As above for the first user operating as a lending user, the transaction parameters defined by the first user profile data may, in some embodiments, vary for the first user acting as a recipient user based upon the user profile data associated with the second user and associated second user device 106. By way of continued example, the desired number or amount of physical currency notes that the first user is willing to receive from the second user may increase or decrease based upon the associated transaction fee charged by the second user.

As shown in operation 510, the apparatus (e.g., proximate transaction server 200) includes means, such as communications circuitry 208, identification circuitry 210, or the like, for determining a plurality of users proximate the first user device 102 and the first user. By way of continued example, each user device (e.g., first user device 102, second user device 106, and/or third user device 108) in communication with the proximate transaction server 200 may provide an indication of the geolocation of the respective user device. In some instances, each user device may periodically provide geolocation data (e.g., global positioning system (GPS) coordinates or the like) to the proximate transaction server 200. In other instances, the proximate transaction server 200 may determine the location of each user device based upon, for example, connectivity with an access point, an interaction with a scanning device, an electronic transaction with a merchant, and/or the like. As such, the determination of a second user that is proximate the first user and first user device 102 may include analyzing user profile data of a plurality of user devices having geolocation data indicative of a defined proximity to the first user device 102, as defined by proximity thresholds, geofences, or the like.

As shown in operation 515, the apparatus (e.g., proximate transaction server 200) includes means, such as communications circuitry 208, identification circuitry 210, or the like, for accessing, via the database (e.g., user profile database 110), user profile data associated with each user from amongst the plurality of users proximate the first user device 102 and the first user. Similar to operation 505 above, each user profile data of the plurality of users determined to be proximate the first user and first user device 102 may include one or more transaction parameters that define requirements (e.g., repayment terms, interest rate, transaction fees, etc.) of the respective user with regard to a proximate financial transaction with the first user. When the first user and first user device 102 are acting as a lending user, the second user profile data and transactions parameters may define instructions or preferences associated with the second user operating as a recipient user as described above. When the first user and first user device 102 are acting as a recipient user, the second user profile data and transactions parameters may define instructions or preferences associated with the second user operating as a lending user as described above.

As shown in operation 520, the apparatus (e.g., proximate transaction server 200) includes means, such as communications circuitry 208, identification circuitry 210, or the like, for determining the second user device 102 and second user as a user from amongst the plurality of users having user profile data that satisfies one or more transaction parameters defined by the first user profile data. By way of example, the identification server 200 may determine a plurality of users (e.g., potential second users and second user devices 106) at operation 510 that are proximate the first user and first user device 102. A portion of the plurality of users may further satisfy the transaction parameters defined by the first user profile data of the first user. Said differently one or more user devices may include instructions, preferences, rules, or the like that satisfy the instructions, rules, preferences, or the like set by the first user for participating in a proximate financial transaction. As such, the identification circuitry 210 may determine at least one second user and associated second user device 106 (e.g., or a plurality of users and associated user devices) for generating identification data for display to the first user. The identification data as described above may include the user profile data associated with the respective user for viewing by the first user via the first user device. In doing so, the proximate transaction server 200 may allow the first user (e.g., a lending user or a recipient user) to select the second user from amongst a plurality of compliant users (e.g., proximate users that further satisfy the transaction parameters defined by the first user profile data).

In some embodiments, as shown in operation 525, the apparatus (e.g., proximate transaction server 200) includes means, such as communications circuitry 208, identification circuitry 210, or the like, for determining a third user device 108 associated with a third user and a third user profile proximate the first user and the second user for participation in the proximate financial transaction. In some embodiments, the plurality of users proximate the first user and associated first user device 102 may not, when taken alone, satisfy one or more of the transaction parameters of the first user. By way of example, the first user may be operating as a recipient user and request a defined amount of physical currency notes. This amount may exceed the amount of physical currency notes possessed by any single second user. As such, the identification circuitry 210 may determine a third user and associated third user device 108 proximate the first user and the second user for participation in the proximate financial transaction. In such an embodiment, the second user and the third user may, when taken together, provide the requested physical currency notes to the first user. In response, the payment circuitry 212 may operate to effectuate financial transactions to each of the second user (e.g., a second user account) and the third user (e.g., a third user account) based upon the transfer of physical currency notes.

In doing so, example implementations of embodiments of the present disclosure may provide devices and environments in which users may readily ascertain those that are willing to lend physical currency and those that need physical currency. In operation, embodiments of the present disclosure may receive a request for participation in a proximate financial transaction by a first user (e.g., recipient user or lending user) and may determine a second user (e.g., a lending user or recipient user) proximate the first user for participating in the proximate financial transaction. The systems may present identification data, in an augmented reality (AR) environment or otherwise, to the first user that identifies the second user (e.g., an AR marker or the like) and detect the transfer of physical currency between the first and second users. Once physical currency is exchanged, the system may effectuate an electronic financial transaction between accounts of the first user and the second user. In some embodiments, user profile data (e.g., amount for lending/receiving, credit score, transaction history, etc.) for the first user may be used to determine the second user with which the first user may interact. In this way, the inventors have identified that the advent of emerging computing technologies have created a new opportunity for solutions for financial transactions which were historically unavailable. In doing so, such example implementations confront and solve at least two technical challenges: (1) they reliably determine proximate users that satisfy transaction parameters, and (2) they authenticate financial transactions that include the exchange of physical currency.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the proximate transaction server 200 and executed by a processor 202 of the proximate transaction server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications of the embodiments set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for proximate financial transactions, the computer-implemented method comprising:
receiving, via a computing device, a request for participation in a proximate financial transaction by a first user device associated with a first user and a first user profile, wherein the proximate financial transaction is associated with a transfer of physical currency notes and the first user profile includes one or more transaction parameters that define requirements of the first user with regard to the proximate financial transaction;

determining at least a second user device associated with a second user and a second user profile proximate the first user for participation in the proximate financial transaction based on the second user profile satisfying the one or more transaction parameters included in the first user profile;

generating, on the first user device, an augmented reality (AR) environment having at least one digital object overlaid onto a real-world environment;

rendering, in the AR environment on the first user device in response to determining the second user device for participation in the proximate financial transaction, a digital object based upon identification data of the second user, wherein the digital object identifies the second user in the AR environment;

detecting the transfer of physical currency notes between the first user and the second user based on a streaming collection of image data, wherein the streaming collection of image data includes one or more images captured by the first user device of at least a portion of the real-world environment; and effectuating an electronic financial transaction between a first user account of the first user and a second user account of the second user responsive to the transfer of physical currency notes.

2. The computer-implemented method according to claim 1, wherein effectuating the electronic financial transaction between the first user account and the second user account further comprises transmitting an actionable notification to the first user device and the second user device.

3. The computer-implemented method according to claim 2, further comprising, in an instance in which the computing device receives responsive approval to the actionable notification from the first user device and the second user device, authenticating the electronic financial transaction between the first user account and the second user account.

4. The computer-implemented method according to claim 2, further comprising, in an instance in which the computing device fails to receive responsive approval to the actionable notification from either the first user device or the second user device, preventing the electronic financial transaction between the first user account and the second user account.

5. The computer-implemented method according to claim 1, wherein determining the second user device associated with the second user and the second user profile for participation in the proximate financial transaction further comprises:

accessing, via a database, first user profile data of the first user;

determining a plurality of users proximate the first user device and the first user;

accessing, via the database, user profile data associated with each user from amongst the plurality of users proximate the first user device and the first user; and determining the second user device and second user as a user from amongst the plurality of users having user profile data that satisfies one or more transaction parameters defined by the first user profile data.

6. The computer-implemented method according to claim 1, further comprising determining a third user device associated with a third user and a third user profile proximate the first user and the second user for participation in the proximate financial transaction.

7. The computer-implemented method according to claim 1, wherein the one or more transaction parameters include one or more of repayment terms, interest rates, and transaction fees.

8. An apparatus for proximate financial transactions, the apparatus comprising:

communications circuitry configured to receive a request for participation in a proximate financial transaction by a first user device associated with a first user and a first user profile, wherein the proximate financial transaction is associated with a transfer of physical currency notes and the first user profile includes one or more transaction parameters that define requirements of the first user with regard to the proximate financial transaction;

identification circuitry configured to determine at least a second user device associated with a second user and a second user profile proximate the first user for participation in the proximate financial transaction based on the second user profile satisfying the one or more transaction parameters included in the first user profile;

augmented reality circuitry configured to:
  generate, on the first user device, an augmented reality (AR) environment having at least one digital object overlaid onto a real-world environment, and
  render, in the AR environment on the first user device in response to determining the second user device for participation in the proximate financial transaction, a digital object based upon identification data of the second user, wherein the digital object identifies the second user in the AR environment; and payment circuitry configured to:
  detect the transfer of physical currency notes between the first user and the second user based on a streaming collection of image data, wherein the streaming collection of image data includes one or more images captured by the first user device of at least a portion of the real-world environment; and
  effectuate an electronic financial transaction between a first user account of the first user and a second user account of the second user responsive to the transfer of physical currency notes.

9. The apparatus according to claim 8, wherein the payment circuitry is further configured to transmit an actionable notification to the first user device and the second user device.

10. The apparatus according to claim 9, wherein, in an instance in which the communications circuitry receives responsive approval to the actionable notification from the first user device and the second user device, the payment circuitry is further configured to authenticate the electronic financial transaction between the first user account and the second user account.

11. The apparatus according to claim 9, further comprising, in an instance in which the communications circuitry fails to receive responsive approval to the actionable notification from either the first user device or the second user device, the payment circuitry is further configured to prevent the electronic financial transaction between the first user account and the second user account.

12. The apparatus according to claim 8, wherein the identification circuitry, in determining the second user device associated with the second user and second user profile for participation in the proximate financial transaction, is further configured to:

access, via a database, first user profile data of the first user;

determine a plurality of users proximate the first user device and the first user;

access, via the database, user profile data associated with each user from amongst the plurality of users proximate the first user device and the first user; and determine the second user device and second user as a user from amongst the plurality of users having user profile data that satisfies one or more transaction parameters defined by the first user profile data.

13. The apparatus according to claim 8, wherein the identification circuitry is further configured to determine a third user device associated with a third user and a third user profile proximate the first user and the second user for participation in the proximate financial transaction.

14. The apparatus according to claim 8, wherein the one or more transaction parameters include one or more of repayment terms, interest rates, and transaction fees.

15. A non-transitory computer-readable storage medium for proximate financial transactions, the non-transitory computer-readable storage medium storing instructions that, when executed, cause an apparatus to:

receive a request for participation in a proximate financial transaction by a first user device associated with a first user and a first user profile, wherein the proximate financial transaction is associated with a transfer of physical currency notes and the first user profile includes one or more transaction parameters that define requirements of the first user with regard to the proximate financial transaction;

determine at least a second user device associated with a second user and second user profile proximate the first user for participation in the proximate financial transaction based on the second user profile satisfying the one or more transaction parameters included in the first user profile;

generate, on the first user device, an augmented reality (AR) environment having at least one digital object overlaid onto a real-world environment;

rendering, in the AR environment on the first user device in response to determining the second user device for participation in the proximate financial transaction, a digital object based upon identification data of the second user, wherein the digital object identifies the second user in the AR environment;

detect the transfer of physical currency notes between the first user and the second user based on a streaming collection of image data, wherein the streaming collection of image data includes one or more images captured by the first user device of at least a portion of the real-world environment; and effectuate an electronic financial transaction between a first user account of the first user and a second user account of the second user responsive to the transfer of physical currency notes.

16. The non-transitory computer-readable storage medium according to claim 15 storing instruction that, when executed, cause the apparatus to:

transmit an actionable notification to the first user device and the second user device; and in an instance in which responsive approval to the actionable notification is received from the first user device and the second user device, authenticate the electronic financial transaction between the first user account and the second user account.

17. The non-transitory computer-readable storage medium according to claim 15 storing instruction that, when executed, cause the apparatus to:

transmit an actionable notification to the first user device and the second user device; and in an instance in which responsive approval to the actionable notification is not received from either the first user device or the second user device, prevent the electronic financial transaction between the first user account and the second user account.

18. The non-transitory computer-readable storage medium according to claim 15 storing instruction that, when executed, cause the apparatus to:

access first user profile data of the first user;

determine a plurality of users proximate the first user device and the first user; access user profile data associated with each user from amongst the plurality of users proximate the first user device and the first user; and determine the second user device and second user as a user from amongst the plurality of users having user profile data that satisfies one or more transaction parameters defined by the first user profile data.

19. The non-transitory computer-readable storage medium according to claim 15 storing instruction that, when executed, cause the apparatus to determine a third user device associated with a third user and a third user profile proximate the first user and the second user for participation in the proximate financial transaction.

20. The non-transitory computer-readable storage medium according to claim 15, wherein the one or more transaction parameters include one or more of repayment terms, interest rates, and transaction fees.

* * * * *